US012795661B2

(12) United States Patent
Hugl et al.

(10) Patent No.: US 12,795,661 B2
(45) Date of Patent: Nov. 10, 2026

(54) APPARATUSES, METHODS AND COMPUTER PROGRAMS FOR CONTROLLING TRANSMISSION OF SPS HARQ-ACK AND PUCCH REPETITIONS

(71) Applicant: Nokia Technologies Oy, Espoo (FI)

(72) Inventors: Klaus Hugl, Vienna (AT); Matha Deghel, Massy (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 301 days.

(21) Appl. No.: 18/620,174

(22) Filed: Mar. 28, 2024

(65) Prior Publication Data

US 2024/0340889 A1 Oct. 10, 2024

(30) Foreign Application Priority Data

Apr. 5, 2023 (GB) ..................................... 2305085

(51) Int. Cl.
*H04W 72/1268* (2023.01)
*H04L 1/1812* (2023.01)
(Continued)

(52) U.S. Cl.
CPC ....... *H04W 72/1268* (2013.01); *H04L 1/1812* (2013.01); *H04W 72/0446* (2013.01);
(Continued)

(58) Field of Classification Search
None
See application file for complete search history.

(56) References Cited

U.S. PATENT DOCUMENTS 10,631,171 B2 * 4/2020 Song .................. H04L 12/6418
12,082,292 B2 * 9/2024 Tseng ............... H04W 52/0229
(Continued)

FOREIGN PATENT DOCUMENTS

CN 112217617 A 1/2021
CN 115699976 A 2/2023
(Continued)

OTHER PUBLICATIONS

Extended European Search Report received for corresponding European Patent Application No. 24166047.1, dated Sep. 12, 2024, 9 pages.

(Continued)

*Primary Examiner* — Faiyazkhan Ghafoerkhan
(74) *Attorney, Agent, or Firm* — BURR & FORMAN LLP

(57) ABSTRACT

Certain examples of the present disclosure relate to controlling the transmission of Semi-Persistent Scheduling Hybrid Automatic Repeat request Acknowledgment, SPS HARQ-ACK, and Physical Uplink Control Channel, PUCCH, repetitions. Some examples provide an apparatus configured for: determining Discontinuous Reception, DRX, timing information, wherein the DRX timing information is indicative of at least one time period of cell DRX inactivity; determining PUCCH resource information (205), wherein the PUCCH resource information is indicative of a PUCCH resource for the apparatus to transmit a SPS HARQ-ACK; and controlling a transmission of the SPS HARQ-ACK based at least in part on the DRX timing information and the PUCCH resource information.

13 Claims, 2 Drawing Sheets

(51) Int. Cl.

| | |
|---|---|
| ***H04W 72/0446*** | (2023.01) |
| ***H04W 72/11*** | (2023.01) |
| ***H04W 72/21*** | (2023.01) |
| ***H04W 76/28*** | (2018.01) |

(52) U.S. Cl.

CPC ............ *H04W 72/11* (2023.01); *H04W 72/21* (2023.01); *H04W 76/28* (2018.02)

(56) References Cited

U.S. PATENT DOCUMENTS

| | | | | |
|---|---|---|---|---|
| 12,382,540 B2 * | 8/2025 | Zhang | H04L 1/1822 |
| 12,526,746 B2 * | 1/2026 | Kim | H04L 5/0053 |
| 2022/0321277 A1 * | 10/2022 | Babaei | H04L 1/1819 |
| 2022/0353017 A1 * | 11/2022 | Babaei | H04L 1/1812 |
| 2023/0047579 A1 * | 2/2023 | Zhang | H04L 1/1883 |
| 2023/0131118 A1 * | 4/2023 | Kim | H04L 5/0053 370/311 |
| 2023/0254850 A1 * | 8/2023 | Moon | H04W 72/02 370/329 |
| 2024/0147573 A1 * | 5/2024 | Tseng | H04W 52/0229 |
| 2024/0267985 A1 * | 8/2024 | Moon | H04W 76/28 |
| 2024/0340889 A1 * | 10/2024 | Hugl | H04W 72/21 |
| 2024/0349299 A1 * | 10/2024 | Lee | H04W 76/28 |
| 2024/0365428 A1 * | 10/2024 | Fu | H04L 1/1822 |
| 2024/0381373 A1 * | 11/2024 | Bagheri | H04L 5/0055 |
| 2025/0024447 A1 * | 1/2025 | Lee | H04W 72/11 |

FOREIGN PATENT DOCUMENTS

| | | |
|---|---|---|
| WO | 2022/202741 A1 | 9/2022 |
| WO | 2023/060597 A1 | 4/2023 |
| WO | 2023/133691 A1 | 7/2023 |

OTHER PUBLICATIONS

“Discussion Summary #3 for enhancements on cell DTX/DRX mechanism”, 3GPP TSG RAN WG1 Meeting #112, R1-2302218, Agenda Item: 9.7.2, Intel Corporation, Feb. 27-Mar. 3, 2023, 57 pages.

“Draft Report of 3GPP TSG RAN WG1 #106-e v0.2.0 (Online meeting, Aug. 16-27, 2021)”, 3GPP TSG RAN WG1 Meeting #106bis-e, R1-210xxxx, MCC Support, Oct. 11-19, 2021, 166 pages.

“3rd Generation Partnership Project; Technical Specification Group Radio Access Network; NR; Radio Resource Control (RRC) protocol specification (Release 17)”, 3GPP TS 38.331 V17.3.0, Dec. 2022, pp. 1-1318.

“3rd Generation Partnership Project; Technical Specification Group Radio Access Network; NR; Physical layer procedures for data (Release 17)”, 3GPP TS 38.214, V17.4.0, Dec. 2022, pp. 1-231.

“3rd Generation Partnership Project; Technical Specification Group Radio Access Network; NR; Medium Access Control (MAC) protocol specification (Release 17)”, 3GPP TS 38.321, V17.3.0, Dec. 2022, pp. 1-251.

“New WID: Network energy savings for NR”, 3GPP TSG RAN Meeting #98-e, RP-223540, Agenda Item: 9.1.1, Huawei, Dec. 12-16, 2022, pp. 1-6.

“3rd Generation Partnership Project; Technical Specification Group Radio Access Network; Study on network energy savings for NR (Release 18)”, 3GPP TR 38.864, V18.0.0, Dec. 2022, pp. 1-71.

“UE feedback enhancements for HARQ-ACK”, 3GPP TSG RAN WG1 Meeting #104bis-e, R1-2102351, Agenda Item: 8.3.1.1, Huawei, Apr. 12-20, 2021, 9 pages.

“Cell DTX/DRX mechanism”, 3GPP RAN WG2 Meeting #121, R2-2300632, Agenda Item: 8.3.2, InterDigital, Feb. 27-Mar. 3, 2023, pp. 1-7.

“Discussions on cell DTX-DRX for network energy saving”, 3GPP TSG RAN WG1 #112, R1-2300588, Agenda item: 9.7.2, Xiaomi, Feb. 27-Mar. 3, 2023, pp. 1-3.

“Discussion on cell DTX/DRX mechanism for network energy saving”, 3GPP TSG RAN WG1 Meeting #112, R1-2301699, Agenda Item: 9.7.2, CEWiT, Feb. 27-Mar. 3, 2023, 2 pages.

“On HARQ-ACK reporting enhancements”, 3GPP TSG RAN WG1 #104b-e, R1-2103236, Agenda Item: 8.3.1.1, Samsung, Apr. 12-20, 2021, pp. 1-12.

Combined Search and Examination Report received for corresponding United Kingdom Patent Application No. 2305085.9, dated Oct. 18, 2023, 6 pages.

“Discussion Summary #1 for enhancements on cell DTX/DRX mechanism”, 3GPP TSG RAN WG1 Meeting #112, R1-2301815, Agenda item: 9.7.2, Intel Corporation, Feb. 27-Mar. 3, 2023, 47 pages.

“5G; NR; Physical layer procedures for control (3GPP TS 38.213 version 17.5.0 Release 17)”, ETSI TS 138 213, V17.5.0, Apr. 2023, 264 pages.

“Considerations on Cell DTX/DRX”, 3GPP TSG-RAN WG2 Meeting #121, R2-2300378, Agenda Item: 8.3.2 DTX/DRX mechanism, KDDI Corporation, Feb. 27-Mar. 3, 2023, pp. 1-5.

* cited by examiner

APPARATUSES, METHODS AND COMPUTER PROGRAMS FOR CONTROLLING TRANSMISSION OF SPS HARQ-ACK AND PUCCH REPETITIONS

TECHNOLOGICAL FIELD

Examples of the present disclosure relate to controlling the transmission of Semi-Persistent Scheduling Hybrid Automatic Repeat request Acknowledgment, SPS HARQ-ACK, and Physical Uplink Control Channel, PUCCH, repetitions. Some examples relate to an apparatus, a method, a system, a computer program for controlling the transmission of SPS HARQ-ACKs. Some examples relate to an apparatus, a method, a system, a computer program for controlling PUCCH repetitions.

BACKGROUND

Conventional procedures and mechanisms for controlling the transmission of SPS HARQ-ACKs and PUCCH repetitions are not always optimal.

In some circumstances it may be desirable to provide improved control of SPS HARQ-ACKs transmissions and PUCCH repetitions that may enable reduced power consumption, e.g. of a receiving cell/gNB.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

The scope of protection sought for various embodiments of the invention is set out by the claims.

According to various, but not necessarily all, examples of the disclosure there are provided examples as claimed in the appended claims. Any examples and features described in this specification that do not fall under the scope of the independent claims are to be interpreted as examples useful for understanding various embodiments of the invention.

According to at least some examples of the disclosure there is provided an apparatus comprising:

means for determining Discontinuous Reception, DRX, timing information, wherein the DRX timing information is indicative of at least one time period of cell DRX inactivity;

means for determining Physical Uplink Control Channel, PUCCH, resource information, wherein the PUCCH resource information is indicative of a PUCCH resource for the apparatus to transmit a Semi-Persistent Scheduling Hybrid Automatic Repeat request Acknowledgment, SPS HARQ-ACK; and means for controlling a transmission of the SPS HARQ-ACK based at least in part on the DRX timing information and the PUCCH resource information.

According to various, but not necessarily all, examples of the disclosure there is provided a method comprising:

determining Discontinuous Reception, DRX, timing information, wherein the DRX timing information is indicative of at least one time period of cell DRX inactivity;

determining Physical Uplink Control Channel, PUCCH, resource information, wherein the PUCCH resource information is indicative of a PUCCH resource for the apparatus to transmit a Semi-Persistent Scheduling Hybrid Automatic Repeat request Acknowledgment, SPS HARQ-ACK; and controlling a transmission of the SPS HARQ-ACK based at least in part on the DRX timing information and the PUCCH resource information.

According to various, but not necessarily all, examples of the disclosure there is provided a chipset comprising processing circuitry configured to perform the above-mentioned method.

According to various, but not necessarily all, examples of the disclosure there is provided a module, circuitry, device and/or system comprising means for performing the above-mentioned method.

According to various, but not necessarily all, examples of the disclosure there is provided a computer program comprising instructions, which when executed by an apparatus, cause the apparatus to perform:

determining Discontinuous Reception, DRX, timing information, wherein the DRX timing information is indicative of at least one time period of cell DRX inactivity;

determining Physical Uplink Control Channel, PUCCH, resource information, wherein the PUCCH resource information is indicative of a PUCCH resource for the apparatus to transmit a Semi-Persistent Scheduling Hybrid Automatic Repeat request Acknowledgment, SPS HARQ-ACK; and controlling a transmission of the SPS HARQ-ACK based at least in part on the DRX timing information and the PUCCH resource information.

According to various, but not necessarily all, examples of the disclosure there is provided an apparatus comprising:

at least one processor; and at least one memory storing instructions that, when executed by the at least one processor, cause the apparatus at least to:

determine Discontinuous Reception, DRX, timing information, wherein the DRX timing information is indicative of at least one time period of cell DRX inactivity;

determine Physical Uplink Control Channel, PUCCH, resource information, wherein the PUCCH resource information is indicative of a PUCCH resource for the apparatus to transmit a Semi-Persistent Scheduling Hybrid Automatic Repeat request Acknowledgment, SPS HARQ-ACK; and control a transmission of the SPS HARQ-ACK based at least in part on the DRX timing information and the PUCCH resource information.

According to various, but not necessarily all, examples of the disclosure there is provided a non-transitory computer readable medium encoded with instructions that, when executed by at least one processor, causes at least the following to be performed:

determining Discontinuous Reception, DRX, timing information, wherein the DRX timing information is indicative of at least one time period of cell DRX inactivity;

determining Physical Uplink Control Channel, PUCCH, resource information, wherein the PUCCH resource information is indicative of a PUCCH resource for the apparatus to transmit a Semi-Persistent Scheduling Hybrid Automatic Repeat request Acknowledgment, SPS HARQ-ACK; and controlling a transmission of the SPS HARQ-ACK based at least in part on the DRX timing information and the PUCCH resource information.

According to at least some examples of the disclosure there is provided an apparatus comprising:

means for transmitting, to a User Equipment, UE, Discontinuous Reception, DRX, timing information, wherein the DRX timing information is indicative of at least one time period of cell DRX inactivity;

means for transmitting, to the UE, Physical Uplink Control Channel, PUCCH, resource information, wherein the PUCCH resource information is indicative of a PUCCH resource for the UE to transmit a Semi-Persistent Scheduling Hybrid Automatic Repeat request Acknowledgment, SPS HARQ-ACK; and means for controlling, based at least in part on the DRX timing information and the PCCH resource information, a reception of the SPS HARQ-ACK from the UE.

According to various, but not necessarily all, examples of the disclosure there is provided a method comprising:

transmitting, to a User Equipment, UE, Discontinuous Reception, DRX, timing information, wherein the DRX timing information is indicative of at least one time period of cell DRX inactivity;

transmitting, to the UE, Physical Uplink Control Channel, PUCCH, resource information, wherein the PUCCH resource information is indicative of a PUCCH resource for the UE to transmit a Semi-Persistent Scheduling Hybrid Automatic Repeat request Acknowledgment, SPS HARQ-ACK; and controlling, based at least in part on the DRX timing information and the PCCH resource information, a reception of the SPS HARQ-ACK from the UE.

According to various, but not necessarily all, examples of the disclosure there is provided a chipset comprising processing circuitry configured to perform the above-mentioned method.

According to various, but not necessarily all, examples of the disclosure there is provided a module, circuitry, device and/or system comprising means for performing the above-mentioned method.

According to various, but not necessarily all, examples of the disclosure there is provided a computer program comprising instructions, which when executed by an apparatus, cause the apparatus to perform:

transmitting, to a User Equipment, UE, Discontinuous Reception, DRX, timing information, wherein the DRX timing information is indicative of at least one time period of cell DRX inactivity;

transmitting, to the UE, Physical Uplink Control Channel, PUCCH, resource information, wherein the PUCCH resource information is indicative of a PUCCH resource for the UE to transmit a Semi-Persistent Scheduling Hybrid Automatic Repeat request Acknowledgment, SPS HARQ-ACK; and controlling, based at least in part on the DRX timing information and the PCCH resource information, a reception of the SPS HARQ-ACK from the UE.

According to various, but not necessarily all, examples of the disclosure there is provided an apparatus comprising:

at least one processor; and at least one memory storing instructions that, when executed by the at least one processor, cause the apparatus at least to:

transmit, to a User Equipment, UE, Discontinuous Reception, DRX, timing information, wherein the DRX timing information is indicative of at least one time period of cell DRX inactivity;

transmit, to the UE, Physical Uplink Control Channel, PUCCH, resource information, wherein the PUCCH resource information is indicative of a PUCCH resource for the UE to transmit a Semi-Persistent Scheduling Hybrid Automatic Repeat request Acknowledgment, SPS HARQ-ACK; and control, based at least in part on the DRX timing information and the PCCH resource information, a reception of the SPS HARQ-ACK from the UE.

According to various, but not necessarily all, examples of the disclosure there is provided a non-transitory computer readable medium encoded with instructions that, when executed by at least one processor, causes at least the following to be performed:

transmit, to a User Equipment, UE, Discontinuous Reception, DRX, timing information, wherein the DRX timing information is indicative of at least one time period of cell DRX inactivity;

transmit, to the UE, Physical Uplink Control Channel, PUCCH, resource information, wherein the PUCCH resource information is indicative of a PUCCH resource for the UE to transmit a Semi-Persistent Scheduling Hybrid Automatic Repeat request Acknowledgment, SPS HARQ-ACK; and control, based at least in part on the DRX timing information and the PCCH resource information, a reception of the SPS HARQ-ACK from the UE.

The following portion of this 'Brief Summary' section describes various features that may be features of any of the examples described in the foregoing portion of the 'Brief Summary' section mutatis mutandis. The description of a function should additionally be considered to also disclose any means suitable for performing that function, or any instructions stored in at least one memory that, when executed by at least one processor, cause an apparatus to perform that function.

In some but not necessarily all examples, the PUCCH resource is in a first PUCCH slot, and wherein the means for controlling the transmission of the SPS HARQ-ACK comprises at least one selected from a group of:

means for preventing, based at least in part on the DRX timing information and the PUCCH resource information, transmission of the SPS HARQ-ACK using the PUCCH resource;

means for preventing, based at least in part on the DRX timing information and the PUCCH resource information, transmission of the SPS HARQ-ACK during the at least one time period of cell DRX inactivity;

means for determining to defer the transmission of the SPS HARQ-ACK to a second PUCCH slot based at least in part on determining whether the PUCCH resource at least partially overlaps in time with the at least one time period of cell DRX;

means for deferring the transmission of the SPS HARQ-ACK to a second PUCCH slot responsive to determining that the PUCCH resource at least partially overlaps in time with the at least one time period of cell DRX inactivity;

means for performing, responsive to determining that the PUCCH resource at least partially overlaps in time with the at least one time period of cell DRX inactivity, a procedure to defer the transmission of the SPS HARQ-ACK to a second PUCCH slot; and means for transmitting a deferred transmission of the SPS HARQ-ACK in a second PUCCH resource in a second PUCCH slot.

In some but not necessarily all examples, the apparatus further comprise:

means for determining, based at least in part on the DRX timing information, a second PUCCH resource in a second PUCCH slot for the apparatus to transmit the SPS HARQ-ACK.

In some but not necessarily all examples, the means for determining the second PUCCH resource comprises at least one selected from the group of:

means for determining the second PUCCH slot such that the second PUCCH resource in the second PUCCH slot does not coincide in time with the at least one time period of cell DRX inactivity; and means for determining the second PUCCH slot such that a time difference between a first PUCCH slot the PUCCH resource is in and the second PUCCH slot does not exceed a threshold deferral time, and optionally wherein the threshold deferral time is based at least in part on a received maximum deferral time related to cell DRX inactive periods.

In some but not necessarily all examples, the apparatus further comprises means for transmitting the SPS HARQ-ACK using the second PUCCH resource in the second PUCCH slot.

In some but not necessarily all examples, the transmission of the SPS HARQ-ACK is deferred and the deferred transmission of the SPS HARQ-ACK is multiplexed with at least one selected from the group of:

a HARQ-ACK;

at least one further SPS HARQ-ACK; and an Uplink Control Information, UCI.

In some but not necessarily all examples, the apparatus further comprises:

means for receiving configuration information for configuring the apparatus to perform an SPS HARQ-ACK DRX deferral procedure for deferring transmission of the SPS HARQ-ACK based at least in part on the DRX timing information.

In some but not necessarily all examples, the PUCCH resource information is received by at least one from the group of:

dedicated PUCCH resource configuration received from the RAN node;

PUCCH-ResourceSet; and

SPS-PUCCH-AN-List in PUCCH-Config, or by n1PUCCH-AN in SPS-Config.

According to at least some examples of the disclosure there is provided an apparatus comprising:

means for determining Discontinuous Reception, DRX, timing information, wherein the DRX timing information is indicative of at least one time period of cell DRX inactivity; and means for controlling a repetition of a PUCCH transmission based at least in part on the DRX timing information.

According to various, but not necessarily all, examples of the disclosure there is provided a method comprising:

determining Discontinuous Reception, DRX, timing information, wherein the DRX timing information is indicative of at least one time period of cell DRX inactivity; and controlling a repetition of a PUCCH transmission based at least in part on the DRX timing information.

According to various, but not necessarily all, examples of the disclosure there is provided a chipset comprising processing circuitry configured to perform the above-mentioned method.

According to various, but not necessarily all, examples of the disclosure there is provided a module, circuitry, device and/or system comprising means for performing the above-mentioned method.

According to various, but not necessarily all, examples of the disclosure there is provided a computer program comprising instructions, which when executed by an apparatus, cause the apparatus to perform:

determining Discontinuous Reception, DRX, timing information, wherein the DRX timing information is indicative of at least one time period of cell DRX inactivity; and controlling a repetition of a PUCCH transmission based at least in part on the DRX timing information.

According to various, but not necessarily all, examples of the disclosure there is provided an apparatus comprising:

at least one processor; and at least one memory storing instructions that, when executed by the at least one processor, cause the apparatus at least to:

determine Discontinuous Reception, DRX, timing information, wherein the DRX timing information is indicative of at least one time period of cell DRX inactivity; and control a repetition of a PUCCH transmission based at least in part on the DRX timing information.

According to various, but not necessarily all, examples of the disclosure there is provided a non-transitory computer readable medium encoded with instructions that, when executed by at least one processor, causes at least the following to be performed:

determine Discontinuous Reception, DRX, timing information, wherein the DRX timing information is indicative of at least one time period of cell DRX inactivity; and control a repetition of a PUCCH transmission based at least in part on the DRX timing information.

According to at least some examples of the disclosure there is provided an apparatus comprising:

means for transmitting, to a User Equipment, UE, Discontinuous Reception, DRX, timing information, wherein the DRX timing information is indicative of at least one time period of cell DRX inactivity; and means for controlling, based at least in part on the DRX timing information, reception of repetition of a PUCCH transmission from the UE.

According to various, but not necessarily all, examples of the disclosure there is provided a method comprising:

transmitting, to a User Equipment, UE, Discontinuous Reception, DRX, timing information, wherein the DRX timing information is indicative of at least one time period of cell DRX inactivity; and controlling, based at least in part on the DRX timing information, reception of repetition of a PUCCH transmission from the UE.

According to various, but not necessarily all, examples of the disclosure there is provided a chipset comprising processing circuitry configured to perform the above-mentioned method.

According to various, but not necessarily all, examples of the disclosure there is provided a module, circuitry, device and/or system comprising means for performing the above-mentioned method.

According to various, but not necessarily all, examples of the disclosure there is provided a computer program comprising instructions, which when executed by an apparatus, cause the apparatus to perform:

transmitting, to a User Equipment, UE, Discontinuous Reception, DRX, timing information, wherein the DRX timing information is indicative of at least one time period of cell DRX inactivity; and controlling, based at least in part on the DRX timing information, reception of repetition of a PUCCH transmission from the UE.

According to various, but not necessarily all, examples of the disclosure there is provided an apparatus comprising:

at least one processor; and at least one memory storing instructions that, when executed by the at least one processor, cause the apparatus at least to:

transmit, to a User Equipment, UE, Discontinuous Reception, DRX, timing information, wherein the DRX timing information is indicative of at least one time period of cell DRX inactivity; and control, based at least in part on the DRX timing information, reception of repetition of a PUCCH transmission from the UE.

According to various, but not necessarily all, examples of the disclosure there is provided a non-transitory computer readable medium encoded with instructions that, when executed by at least one processor, causes at least the following to be performed:

transmit, to a User Equipment, UE, Discontinuous Reception, DRX, timing information, wherein the DRX timing information is indicative of at least one time period of cell DRX inactivity; and control, based at least in part on the DRX timing information, reception of repetition of a PUCCH transmission from the UE.

In some but not necessarily all examples, the apparatus further comprises:

means for determining a plurality of PUCCH slots for the repetition of the PUCCH transmission such that the PUCCH transmission in the plurality of PUCCH slots is not contemporaneous with the at least one time period of cell DRX inactivity, and means for repeating transmission of the PUCCH transmission using the plurality of PUCCH slots.

In some but not necessarily all examples, wherein the means for determining the plurality of PUCCH slots further determines the plurality of PUCCH slots such that the PUCCH transmission in the plurality of PUCCH slots is not contemporaneous with semi-static DL or SSB symbols.

While the above examples of the disclosure and optional features are described separately, it is to be understood that their provision in all possible combinations and permutations is contained within the disclosure. It is to be understood that various examples of the disclosure may comprise any or all of the features described in respect of other examples of the disclosure, and vice versa. Also, it is to be appreciated that any one or more or all of the features, in any combination, may be implemented by/comprised in/performable by an apparatus, a method, and/or computer program instructions as desired, and as appropriate.

BRIEF DESCRIPTION OF THE DRAWINGS

Some examples will now be described with reference to the accompanying drawings in which.

Figure 1:
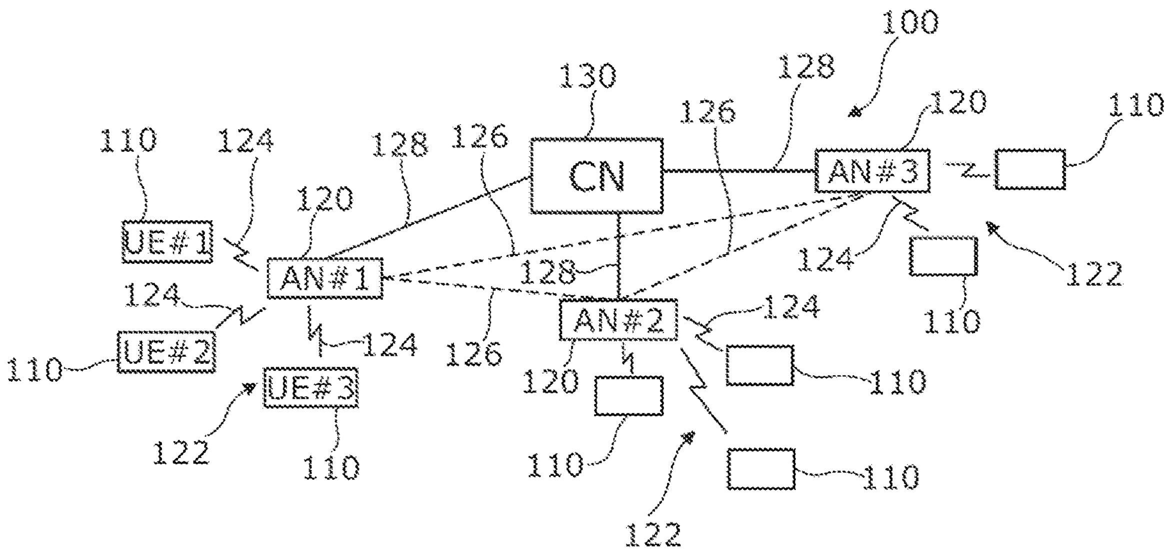
FIG. 1 schematically illustrates an example of a radio telecommunications network suitable for use with examples of the present disclosure.

The figures are not necessarily to scale. Certain features and views of the figures may be shown schematically or exaggerated in scale in the interest of clarity and conciseness. For example, the dimensions of some elements in the figures may be exaggerated relative to other elements to aid explication. Similar reference numerals are used in the figures to designate similar features. For clarity, all reference numerals are not necessarily displayed in all figures.

Abbreviations/Definitions

3GPP 3rd Generation Partnership Project
5G 5th Generation
CORESET Control Resource Set
CSI Channel State Information
DCI Downlink Control Information
DL Downlink
DRX Discontinuous Reception
DTX Discontinuous Transmission
FDD Frequency Division Duplexing
gNB 5G/NR base station
HARQ Hybrid Automatic Repeat request
HARQ-ACK HARQ Acknowledgment
NR New Radio
PUCCH Physical Uplink Control Channel
PUSCH Physical Uplink Shared Channel
PDCCH Physical Downlink Control Channel
PDSCH Physical Downlink Shared Channel
RAN Radio Access Network
RRC Radio Resource Control
RS Reference Signal
SSB Synchronization Signal Block
SPS Semi-Persistent Scheduling
TCI Transmission Configuration Indicator
TDD Time Division Duplex
TRP Transmission Reception Point
UCI Uplink Control Information
UE User Equipment
UL Uplink

DETAILED DESCRIPTION

FIG. 1 schematically illustrates an example of a network 100 suitable for use with examples of the present disclosure. The network comprises a plurality of network nodes including: terminal nodes 110 (also referred to as User Equipment, UE), access nodes 120 (also referred to as Transmission Reception Points, TRPs; Radio Access Network, RAN, nodes, or base stations), and one or more core network nodes 130. The terminal nodes 110 and access nodes 120 communicate with each other. The one or more core network nodes 130 may, in some but not necessarily all examples, communicate with each other. The one or more access nodes 120 may, in some but not necessarily all examples, communicate with each other.

The network 100 is in this example a radio telecommunications network, i.e. a RAN, in which at least some of the terminal nodes 110 and access nodes 120 communicate with each other using transmission/reception of radio waves.

The RAN 100 may be a cellular network comprising a plurality of cells 122 each served by an access node 120. The access nodes 120 comprise cellular radio transceivers. The terminal nodes 110 comprise cellular radio transceivers.

In the particular example illustrated, the network 100 may be a New Radio, NR, network of the Third Generation Partnership Project, 3GPP, and its fifth generation, 5G, technology. In other examples, the network 100 may be a Next Generation, NG, i.e. sixth generation, 6G, Radio Network that is currently under development (i.e. an evolution of the NR network and its 5G technology).

The interfaces between the terminal nodes 110 and the access nodes 120 are radio interfaces 124 (e.g., Uu interfaces). The interfaces between the access nodes 120 and one or more core nodes 130 are backhaul interfaces 128 (e.g., S1 and/or NG interfaces).

Depending on the exact deployment scenario, the access nodes 120 may be RAN nodes such as NG-RAN nodes. NG-RAN nodes may be gNodeBs, gNBs, that provide NG user plane and control plane protocol terminations towards the UE. The gNBs connected by means of NG interfaces to a 5G Core (5GC), more specifically to an Access and Mobility Management Function, AMF, by means of an NG Control Plane, NG-C, interface and to a User Plane Function, UPF, by means of an NG User Plane, NG-U, interface. The access nodes 120 may be interconnected with each other by means of Xn interfaces 126.

The cellular network 100 could be configured to operate in licensed frequency bands, or unlicensed frequency bands (not least such as: unlicensed bands that rely upon a transmitting device to sense the radio resources/medium before commencing transmission, such as via a Listen Before Talk, LBT, procedure; and a 60 GHz unlicensed band where beamforming may be required in order to achieve required coverage).

The access nodes 120 may be deployed in an NG standalone operation/scenario. The access nodes 120 may be deployed in a NG non-standalone operation/scenario. The access nodes may be deployed in a Carrier Aggregation operation/scenario. The access nodes 120 may be deployed in a dual connectivity operation/scenario, i.e., Multi Radio Access Technology-Dual Connection, MR-DC.

In such non-standalone/dual connectivity deployments, the access nodes 120 may be interconnected to each other by means of X2 or Xn interfaces, and connected to an Evolved Packet Core, EPC, by means of an S1 interface or to the 5GC by means of a NG interface.

The terminal nodes 110 are network elements in the network that terminate the user side of the radio link. They are devices allowing access to network services. The terminal nodes 110 may be referred to as User Equipment, UE, mobile terminals or mobile stations. The term 'User Equipment' may be used to designate mobile equipment comprising a smart card for authentication/encryption etc such as a Subscriber Identity Module, SIM. In other examples, the term 'User Equipment' is used to designate a location/position tag, a hyper/smart tag or a mobile equipment comprising circuitry embedded as part of the user equipment for authentication/encryption such as software SIM.

The access nodes 120 are network elements in the network responsible for radio transmission and reception in one or more cells 122 to or from the terminal nodes 110. The access nodes 120 are the network termination of a radio link. An access node 120 may be implemented as a single network equipment, or have a split architecture that is disaggregated/distributed over two or more RAN nodes, such as a Central Unit, CU, a Distributed Unit, DU, a Remote Radio Head-end, RRH, using different functional-split architectures and different interfaces.

Where the access node 120 has a disaggregated (split) architecture, the access node 120 may comprise one or more distributed units, gNB-DU, and a centralized unit, gNB-CU (not shown in FIG. 1). The gNB-CU is a logical node configured to host a Radio Resource Connection, RRC, layer and other layers of the access node 120. The gNB-CU controls the operation of one or more gNB-DUs. The gNB-DU is a logical node configured to host Radio Link Control, RLC, protocol layer, Medium Access Control, MAC, layer and Physical, PHY, layer of the access node 120. The gNB-DU may communicate via a dedicated interface (e.g. an F1 interface) to a RRC layer hosted by the gNB-CU. One gNB-DU may support one or multiple cells 122.

In the following description, an access node/RAN node 120 will be referred to as gNB 120; and a terminal node 110 will be referred to simply as User Equipment, UE 110.

Semi-Persistent Scheduling, SPS, (also known as Configured Scheduling for downlink, DL) is a mechanism in which a PDSCH transmission is scheduled by RRC message.

In Release 16 New Radio, NR, enhanced Ultra Reliable Low Latency Communication, eURLLC, working item, WI, DL SPS was enhanced to support URLLC and Time Sensitive Communication, TSC, traffic. Specifically, some of the enhancements for DL SPS under Industrial Internet of Things, IIoT, are listed below:

- a UE could have up to 8 simultaneous active DL SPS configurations (in a BandWidth Part, BWP), which are separately configured and activated, where the periodicity of an SPS configuration is at least 1 slot.
- The activation of an SPS configuration is done via Physical Downlink Control Channel, PDCCH, and the UE is required to attempt Physical Downlink Shared Channel, PDSCH, detection in each SPS PDSCH occasion and provide corresponding HARQ-ACK feedback. This is regardless of whether there is an actual PDSCH transmission or not, as the UE typically does not know if there will be a transmission or not in this case.
- For the reception of a PDSCH and its corresponding HARQ-ACK feedback, referred to as SPS HARQ-ACK, the UE follows the configuration parameters provided via the activating PDCCH and via RRC.

SPS HARQ-ACK deferral is a UE procedure for deferring HARQ-ACK for SPS PDSCH, as introduced in Release 17 NR, enhanced IIoT and URLLC support, WI. The SPS HARQ-ACK deferral procedure is described in section 9.2.5.4 of TS 38.213 Release 17 version 17.5.0.

Because shorter SPS PDSCH periodicities (down to 1 slot) are supported, there could be cases that the PUCCH carrying HARQ-ACK of SPS PDSCH may not be transmitted for NR Time Division Duplex, TDD, operation because there may be collisions with for example NR Synchronization Signal Block, SSB, semi-static downlink symbols or Control Resource Set, CORESET, #0. This would have negatively impacted the operation, because SPS HARQ-ACK information for periodicities down to one slot may have been lost leading to increased latency and decreased radio efficiency. Therefore, SPS HARQ-ACK deferral was introduced, where, in case a PUCCH carrying SPS HARQ-ACK only from an initial slot of HARQ-ACK transmission (denoted as 'first slot' in section 9.2.5.4 of TS 38.213) only would be colliding with semi-static DL symbols (i.e. symbols indicated as downlink by tdd-UL-DL-Configuration-Common or tdd-UL-DL-ConfigDedicated) or SSB (i.e. symbols indicated for a Synchronization Signal/Physical Broadcast Channel, SS/PBCH, block by ssb-PositionsIn-Burst) or CORESET #0 (i.e. symbols belonging to a CORESET associated with a Type0-PDCCH CSS set), the SPS HARQ-ACK is deferred for transmission to a next available slot for PUCCH transmission (i.e. denoted as "an earliest second slot" in section 9.2.5.4 of TS 38.213). The earliest second slot is the next slot following the first slot, where the deferred SPS HARQ-ACK, after multiplexing, would be mapped on a PUCCH resource for SPS that could be transmitted as there would not be again a collision of the SPS PUCCH resource with semi-static DL symbols, SSB or CORESET #0.

Network energy saving is of great importance for environmental sustainability, to reduce environmental impact (greenhouse gas emissions), and for operational cost savings. As 5G is becoming pervasive across industries and geographical areas, handling more advanced services and applications requiring very high data rates (e.g. Extended Reality, XR), networks are becoming denser, using more antennas, larger bandwidths and more frequency bands.

Energy consumption has become a key part of the operators' Operating expenses, OPEX. Energy costs for operating mobile networks may account for ~23% of total operator costs. Most of the energy consumption comes from the radio access network and, in particular, from Active Antenna Units, AAUs, with data centres and fibre transport accounting for a smaller share. The power consumption of a radio access network may be split into two parts: a dynamic part (which is only consumed when data transmission/reception is ongoing), and the static part (which is consumed all the time to maintain the necessary operation of the radio access devices, even when the data transmission/reception is not on-going).

Discontinuous Transmission, DTX and Discontinuous Reception, DRX (such as Cell DTX/DRX) is a mechanism that has been developed to enable a RAN to save energy and lessen environmental impact.

A Cell DTX/DRX is a cycle of active and non-active periods which may be configured by gNB per serving cell. In the active period of the cell DTX/DRX, the gNB switches on in intervals to perform the transmission and/or reception of signals and channels. An energy saving at the gNB may be achieved by enabling DTX/DRX with reduced transmission and reception. The cell DTX/DRX may be configured to the UE semi-statically based on a number of network parameters such as load, UE traffic, density and arrival rate.

Cell DTX/DRX may be applied to at least UEs in an RRC_CONNECTED state. A periodic Cell DTX/DRX (i.e., active and non-active periods) may be configured by the gNB via UE-specific RRC signalling per serving cell. The below provides examples of possible options of Cell DTX/DRX behaviour during non-active periods:

- Example 1: gNB is expected to turn off all transmission and reception for data traffic and reference signal during Cell DTX/DRX non-active periods.
- Example 2: gNB is expected to turn off its transmission/reception only for data traffic during Cell DTX/DRX non-active periods (i.e., gNB will still transmit/receive reference signals)
- Example 3: gNB is expected to turn off its dynamic data transmission/reception during Cell DTX/DRX non-active periods (i.e., gNB is expected to still perform transmission/reception in periodic resources, including SPS, CG-PUSCH, SR, RACH, and SRS).
- Example 4: gNB is expected to only transmit reference signals (e.g., CSI-RS for measurement).

The Cell DTX/DRX mode may be activated/de-activated via dynamic L1/L2 signalling and UE-specific RRC signalling. Both UE specific and common L1/L2 signalling could be used for activating/deactivating the Cell DTX/DRX mode. Cell DTX and Cell DRX modes may be configured and operated separately (e.g., one RRC configuration set for DL and another for UL). Cell DTX/DRX may also be configured and operated together. At least the following parameters may be configured per Cell DTX/DRX configuration: periodicity, start slot/offset, on duration. The parameters configured per Cell DTX/DRX configuration may specify time granularity such as symbol, slot, sub-frame, or frame level for different starting time, periodicity and durations of DTX/DRX activity/inactivity. Such configuration and parameters may provide DRX timing information indicative of at least one time period of cell DRX inactivity, i.e. a time period in which a gNB is unable to receive signals/transmissions from UEs (such as SPS HARQ-ACKs, and deferred SPS HARQ-ACKs).

An issue that arises when a cell/gNB operates with network energy saving (i.e. DRX is enabled/employed) is that, if an SPS HARQ-ACK feedback instance, e.g. a slot for PUCCH transmission or a PUCCH resource, coincides/overlaps in time with when the gNB is in a DRX non-active period, then the SPS HARQ-ACK would not be received by the gNB. According to current 3GPP standardization, the conventional SPS HARQ-ACK deferral procedure (as defined in section 9.2.5.4 of TS 38.213 Release 17 version 17.5.0) does not take into account cell DRX non-active periods nor address issues where the SPS HARQ-ACK feedback in an initial "first slot" for SPS HARQ-ACK coincides/overlaps in time with a cell DRX non-active period, or when "an earliest second slot" for SPS HARQ-ACK coincides/overlaps in time with a cell DRX non-active period. Also, the SPS HARQ-ACK deferral procedure only considers TDD operation of a cell/gNB, whereas the above-described issue with regards to using DRX and SPS/SPS HARQ-ACK deferral procedure is also applicable to FDD operation of cells/gNBs.

A similar issue arises with regards to the conventional PUCCH repetition procedure (as defined in current 3GPP specifications in section 9.2.6 of TS 38.213 Release 17 version 17.5.0). This provides a deferral procedure for TDD operation to guarantee a number of PUCCH repetitions in case of collision with DL or SSB symbols. With the introduction of cell DRX (non-active periods) the number of PUCCH repetitions could not be guaranteed because certain of the PUCCH repetitions could be transmitted during a cell DRX non-active period, and hence not be received.

Various examples the present disclosure seek to address the above-described issues.

As will be discussed in further detail below, not least with regards to FIG. 2, in certain examples, transmission of an SPS HARQ-ACK is controlled so as to take into account cell DRX inactivity. UEs within a cell, either a TDD cell or a FDD cell, are configured/indicated with DRX timing information (e.g. a cell DRX pattern/cycle configuration that is indicative of/comprises cell DRX non-active periods and cell DRX active periods). UEs may thereby use such DRX timing information to perform an SPS HARQ-ACK deferral procedure responsive to determining that the cell is in a DRX non-active period. Advantageously, this may thereby avoid the SPS HARQ-ACK dropping due to the cell being in a cell-DRX non-active period.

As will be discussed in further detail below, not least with regards to FIG. 3, in certain examples, PUCCH repetition is controlled to as to take into account cell DRX inactivity.

Figure 2:
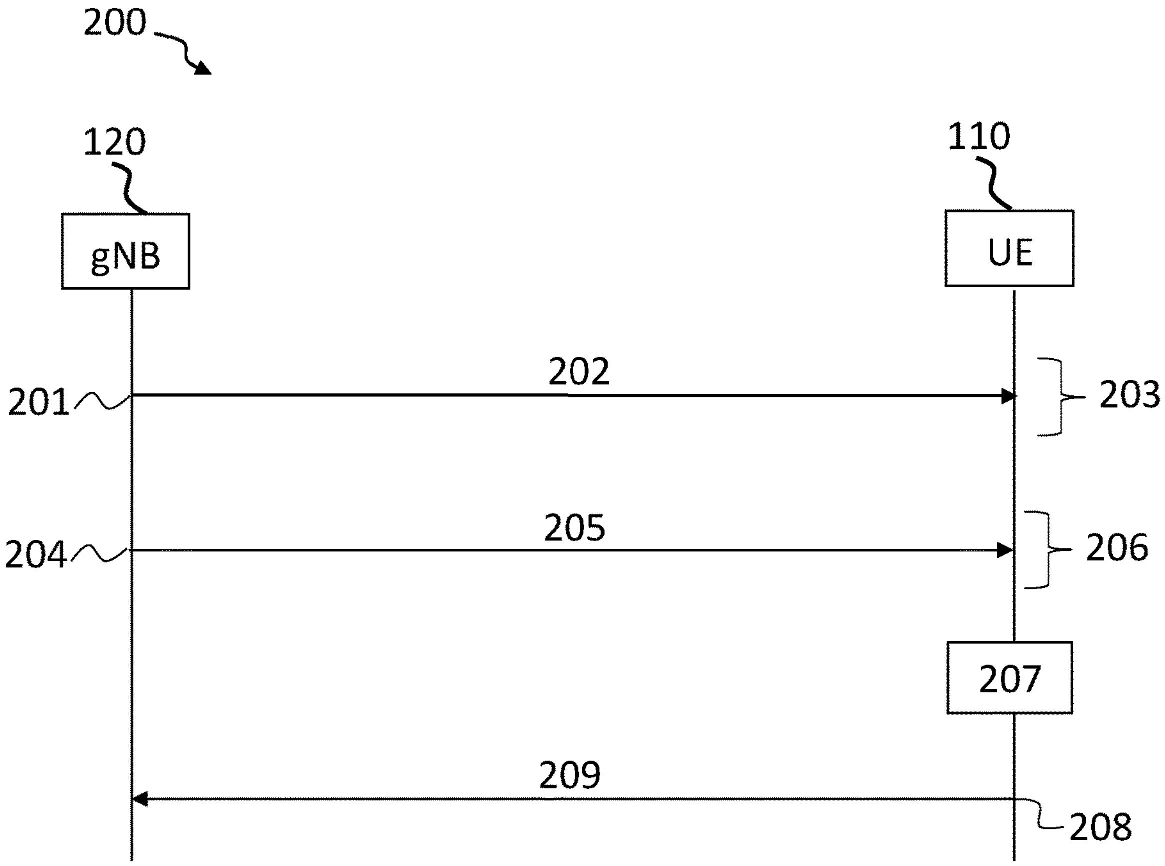
FIG. 2 schematically illustrates a method in accordance with an example of the subject matter described herein.

FIG. 2 schematically illustrates a method 200 in accordance with an example of the subject matter described herein. FIG. 2 illustrates one or more actions/functions performed by/at a plurality of entities (namely a first apparatus and a second apparatus, each of which apparatuses are themselves described with reference to FIG. 4, that shall simply be referred to hereinafter as UE 110 and gNB 120 respectively). FIG. 2 may therefore be considered to illustrate a method performed at/by the UE and a method performed at/by the gNB. The actions/functions depicted in FIG. 2 may also be implemented by a computer program (such as is described with reference to FIG. 5). The blocks illustrated in FIG. 2 may thereby represent actions in a method, functionality performed by an apparatus, and/or sections of instructions/code in a computer program.

In the illustrated method, a gNB transmits/signals, via transmission 201 to a UE 110, Discontinuous Reception, DRX, timing information 202 indicative of at least one time period of cell DRX inactivity. The receipt of such DRX timing information 202 thereby enables the UE to determine, as indicated by 203, DRX timing information. The UE may hence determine at least one time period during which the gNB is in a DRX non-active period/mode/state (and thus consequently would be unable to receive transmissions from the UE).

The gNB also transmits/signals, via transmission 204 to the UE, Physical Uplink Control Channel, PUCCH, resource information 205 indicative of indicative of a PUCCH resource for the UE to transmit a Semi-Persistent Scheduling Hybrid Automatic Repeat request Acknowledgment, SPS HARQ-ACK to the gNB. The PUCCH resource information may be received by one or more of: dedicated PUCCH resource configuration received from the gNB, PUCCH-ResourceSet; SPS-PUCCH-AN-List in PUCCH-Config, or by n1PUCCH-AN in SPS-Config. The PUCCH resource may be a PUCCH resource within a PUCCH slot, such as for example a first slot as defined in 9.2.5.4 of TS 38.213 Release 17 version 17.5.0.

The receipt of PUCCH resource information 205 thereby enables the UE to determine, as indicated by 206, the PUCCH resource for transmitting a SPS HARQ-ACK to the gNB. In this regard, the UE is able to determine an initial/first PUCCH resource for transmitting/carrying a first/initial SPS HARQ-ACK to the gNB. The PUCCH resource may be an initial/first resource within a first PUCCH slot for transmitting/carrying a first/initial SPS HARQ-ACK to the gNB.

As indicated in 207, the UE controls a transmission of the SPS HARQ-ACK based at least in part on the DRX timing information and the PUCCH resource information.

Such control of the transmission of the SPS HARQ-ACK may comprise the UE preventing, based at least in part on the DRX timing information and the PUCCH resource information, transmission of the SPS HARQ-ACK using the PUCCH resource (not shown in FIG. 2). For example, the UE may prevent transmission of the SPS HARQ-ACK to the gNB during a DRX inactive time period of the gNB, i.e. the transmission is prevented in response to the UE determining that the PUCCH resource coincides or overlaps, in the temporal domain, with a DRX inactive time period of the gNB.

In some examples, the UE may prevent transmission of the SPS HARQ-ACK to the gNB in response to the UE determining that a first PUCCH slot (i.e. the PUCCH slot within which the PUCCH resource is carried) coincides or overlaps with a DRX inactive time period of the gNB.

In some scenarios, it is possible that the first PUCCH slot is merely partially overlapping with a period of DRX inactivity and the part of the first PUCCH slot within which the PUCCH resource (that is intended to carry the first/initial SPS HARQ-ACK) is placed/contained does not coincide or overlap with the DRX inactive time period. In this regard, the PUCCH resource itself, i.e. a transmission duration in a number of symbols, does not overlap with the period of DRX inactivity. In response to determining the same, there may not be a need to defer the SPS HARQ-ACK transmission and the UE may transmit the SPS HARQ-ACK using the PUCCH resource.

Control of the transmission of the SPS HARQ-ACK may comprise determining whether or not to defer transmission of the SPS HARQ-ACK based at least in part on determining whether the PUCCH resource at least partially overlaps in time with the at least one time period of cell DRX inactivity of the gNB. For example, responsive to the UE determining that the PUCCH resource coincides or overlaps, in the temporal domain, with a DRX inactive time period of the gNB, then the UE may determine to defer/delay transmission of the SPS HARQ-ACK. In this regard, the transmission may be deferred from the first PUCCH slot to a second PUCCH resource—for example another/subsequent PUCCH resource, e.g. in a second PUCCH slot such as a next available PUCCH slot, at a later time that does not coincide or overlap with a DRX inactive time period of the gNB. The second PUCCH slot may be different to the first PUCCH slot, such as for example an earliest second slot as defined in 9.2.5.4 of TS 38.213 Release 17 version 17.5.0.

Control of the transmission of the SPS HARQ-ACK may also comprise the UE deferring the transmission of the SPS HARQ-ACK responsive to determining that the PUCCH resource at least partially overlaps in time with the at least one time period of cell DRX inactivity of the gNB. The transmission of the SPS HARQ-ACK may be deferred to a second/subsequent PUCCH resource, such as a second PUCCH resource in a next available slot (which may also be referred to as "an earliest second slot") where the condition causing the deferral of the transmission (i.e. the gNB being in a DRX non-active period and hence unable to receive the transmission) is no longer present.

Control of the transmission of the SPS HARQ-ACK may also comprise performing, responsive to determining that the PUCCH resource at least partially overlaps in time with the at least one time period of cell DRX inactivity of the RAN node, a procedure to defer the transmission of the SPS HARQ-ACK. In this regard an SPS HARQ-ACK deferring procedure may be triggered responsive to determining that the PUCCH resource at least partially overlaps in time with the at least one time period of cell DRX inactivity of the RAN node. The SPS HARQ-ACK deferring procedure may be one that takes into account time periods of cell DRX inactivity of the gNB, i.e. defers the transmission until the gNB is no longer in a time period of cell DRX inactivity, but is in a cell DRC active period. In this regard, as discussed in further detail below, an SPS HARQ-ACK deferring procedure somewhat similar to that described in section 9.2.5.4 of TS 38.213 Release 17 version 17.5.0, could be employed, albeit wherein the procedure is enhanced/improved so that the determination as to whether an SPS HARQ-ACK is to be deferred, and how long for, is based at least in part on whether the PUCCH resource for carrying the SPS HARQ-ACK overlaps in time with a DRX non-active period of the gNB.

Control of the transmission of the SPS HARQ-ACK may also comprise transmitting, as shown in 208, the SPS HARQ-ACK 209. In this regard, a deferred transmission may take place wherein the UE transmits the SPS HARQ-ACK in a second PUCCH resource, e.g. a subsequent/second earliest available slot where the PUCCH resource for SPS HARQ-ACK does not overlap/coincide with a cell DRX inactive period of the gNB.

The UE may determine such a second PUCCH resource based at least in part on the DRX timing information, i.e. determine the second PUCCH resource in an earliest second slot such that it does not overlap/coincide, in the temporal domain, with a cell DRX inactive period of the gNB.

Where the transmission of the SPS HARQ-ACK is deferred, the deferred transmission of the SPS HARQ-ACK may be multiplexed with one or more from the group of:

a HARQ-ACK;

at least one further SPS HARQ-ACK (e.g. i.e. a subsequent/new/current SPS HARQ-ACK); and an Uplink Control Information, UCI.

Whilst the above examples have been described primarily from the perspective of the UE, it is to be appreciated that the gNB may perform similar corresponding steps/functionality to that described above and moreover may also provide provisioning and configuration information to the UE to enable to UE to perform the above-described steps/functionality.

Moreover, the gNB may itself control its own reception of SPS HARQ-ACK feedback, transmitted from the UE, based on the DRX timing information and the PUCCH resource information. In this regard, the gNB may determine for itself when an SPS HARQ-ACK is expected to be to deferred as well as on what resources/at what time the deferred SPS HARQ-ACK is expected to be received from the UE.

Whilst the deferral of the SPS HARQ-ACK has been described above as being based on DRX timings (i.e. so as to avoid transmitting the SPS HARQ-ACK when the gNB is in a period of cell DRX inactivity), it is to be appreciated that other conditions may additionally be employed in determining whether to defer SPS HARQ-ACK, not least such as conditions as set out in the UE procedure for deferring HARQ-ACK for SPS PDSCH as set out in the current standard in section 9.2.5.4 of TS 38.213 Release 17 version 17.5.0—which includes conditions to avoid transmitting the SPS HARQ-ACK when such a transmission might collide with DL transmissions from the gNB [e.g. semi-static DL symbols (i.e. symbols indicated as downlink by tdd-UL-DL-ConfigurationCommon or tdd-UL-DL-ConfigDedicated) or SSB (i.e. symbols indicated for a SS/PBCH block by ssb-PositionsInBurst) or CORESET #0 (i.e. symbols belonging to a CORESET associated with a Type0-PDCCH CSS set), is in a period of cell DRX inactivity].

There now follows a discussion of several examples of possible implementations of the above-described DRX-based SPS HARQ-ACK transmission control and deferral. In this regard, the current SPS HARQ-ACK deferral procedure (as set out in section 9.2.5.4 of TS 38.213 Release 17 version 17.5.0) is expanded/enhanced so as to include additional conditions to be taken into account with regards to SPS HARQ-ACK deferral procedure, namely in relation to the indication of a PUCCH resource for a UE to transmit an SPS HARQ-ACK to the gNB and the determination of an earliest second slot.

For TDD/unpaired spectrum cells, in the revised conditions for SPS HARQ-ACK deferral, an SPS HARQ-ACK is for deferral from an initial/first slot, if, after a multiplexing in the initial slot and applying any PHY prioritization:

the PUCCH carrying SPS HARQ-ACK only in the first slot could not be transmitted as the gNB/cell is in DRX non-active period in addition to the (legacy) existing condition of collision with semi-static DL symbols, SSB and CORESET #0.

Thus, for TDD/unpaired spectrum cells, a PUCCH carrying SPS HARQ-ACK only in the first slot would not be transmitted as the cell/gNB is in DRX non-active period and/or there is a collision condition with semi-static DL symbols, SSB, CORSET #0.

For TDD/unpaired spectrum cells, in the revised conditions for determining the earliest second slot, the procedure to determine the earliest second slot is stopped, if after the multiplexing procedure, the PUCCH carrying SPS HARQ-ACK only could not be transmitted as:

the cell/gNB is in DRX non-active period in addition to the (legacy) existing condition of collision with semi-static DL symbols, SSB and CORESET #0.

An example of a possible implementation of cell DRX-based SPS HARQ-ACK deferral for TDD/unpaired spectrum cells will now be briefly described with respect to the "UE procedure for deferring HARQ-ACK for SPS PDSCH" as set out in section 9.2.5.4 of TS 38.213 Release 17 version 17.5.0.

In this regard, a procedure similar to that set out in 9.2.5.4 is performed. However, with regards to the UE's determination of "a PUCCH resource for a PUCCH transmission with first HARQ-ACK information bits for SPS PDSCH receptions that the UE would report for a first time", and the procedural steps related to the UE's determination of various conditions/criteria related to the PUCCH resource that trigger the UE to defer transmission of the SPS HARQ-ACK from the first slot to an earliest second slot, a further/new condition is determined. In this regard, the UE determines whether the PUCCH resource overlaps with a symbol of a DRX non-active period for the cell of PUCCH transmission. Responsive, at least in part, to determining that the PUCCH resource overlaps with a symbol of a DRX non-active period for the cell of PUCCH transmission, the UE may proceed to perform the rest of the procedure for deferring SPS HARQ-ACK. In this regard, the UE may proceed to carry out the procedure the determine an earliest second slot in which to transmit the SPS HARQ-ACK.

Also, with regards to the UE's determination of various conditions/criteria that triggers the UE to stop the procedure to determine the earliest second slot in the slot, a further/new condition is determined. In this regard, the UE determines whether the PUCCH transmission overlaps with a symbol of a DRX non-active period for the cell of PUCCH transmission. Responsive, at least in part, to determining that the PUCCH transmission does not overlap with a symbol of a DRX non-active period for the cell of PUCCH transmission, the UE stops the procedure to determine the earliest second slot in the slot.

In contrast to the current SPS HARQ-ACK deferral procedure (set out in section 9.2.5.4 of TS 38.213 Release 17 version 17.5.0), the above-described DRX-based SPS HARQ-ACK transmission control and deferral is applicable not just for TDD/paired spectrum cell, but is also applicable for FDD/unpaired spectrum cells.

An example of a possible implementation of cell DRX-based SPS HARQ-ACK deferral for FDD/paired spectrum cells will now be briefly described with respect to the "UE procedure for deferring HARQ-ACK for SPS PDSCH" as set out in section 9.2.5.4 of TS 38.213 Release 17 version 17.5.0. It is to be appreciated, however, that not only would this implementation support DRX-based SPS HARQ-ACK transmission control and deferral for FDD cells carrying the PUCCH (and hence enable FDD cells to prevent SPS HARQ-ACK dropping due to cell DRX on FDD cells with PUCCH transmission), but it would also be applicable for TDD cells, such as for TDD cells if only SPS HARQ-ACK deferral due to overlapping with DRX is intended (and collisions with DL/SSB/CORESET #0 symbols would not lead to SPS HARQ-ACK deferral).

In this regard, a procedure similar to that discussed above for cell DRX-based SPS HARQ-ACK deferral for TDD/unpaired spectrum cells is performed. However, with regards to the procedural steps related to the UE's determination of various conditions/criteria related to the PUCCH resource that trigger the UE to defer transmission of the SPS HARQ-ACK from the first slot to an earliest second slot, the condition which relates explicitly to TDD cells is not required and is not determined. In this regard, the UE does not determine whether the PUCCH resource "overlaps with a symbol indicated as downlink by tdd-UL-DL-ConfigurationCommon or tdd-UL-DL-ConfigDedicated, or indicated for a SS/PBCH block by ssb-PositionsInBurst, or belonging to a CORESET associated with a Type0-PDCCH CSS set".

Also, with regards to the UE's determination of various conditions/criteria that triggers the UE to stop the procedure to determine the earliest second slot in the slot, the conditions which relate to explicitly to TDD cells are not required and are not determined. In this regard, the UE does not determine that the PUCCH transmission "does not have any symbol that overlaps with a symbol indicated as downlink by tdd-UL-DL-ConfigurationCommon or tdd-UL-DL-ConfigDedicated, or indicated for a SS/PBCH block by ssb-PositionsInBurst, or belonging to a CORESET associated with a Type0-PDCCH CSS set" and the UE does not stop the procedure to determine the earliest second slot in the slot responsive to determining that the PUCCH transmission "does not have any symbol that overlaps with a symbol indicated as downlink by tdd-UL-DL-ConfigurationCommon or tdd-UL-DL-ConfigDedicated, or indicated for a SS/PBCH block by ssb-PositionsInBurst, or belonging to a CORESET associated with a Type0-PDCCH CSS set".

For FDD/paired spectrum cells (and also TDD/unpaired spectrum cells), in the revised conditions mentioned in the above-described implementation for SPS HARQ-ACK deferral, an SPS HARQ-ACK is for deferral from an initial/first slot, if after a multiplexing in the initial slot and applying any PHY prioritization:

the PUCCH carrying SPS HARQ-ACK is overlapping with a cell/gNB DRX non-active period. Thus, a PUCCH carrying SPS HARQ-ACK only in the first slot would not be transmitted by the UE as the cell/gNB is in a DRX non-active period and the SPS HARQ-ACK would therefore not be received by the gNB.

In the revised conditions for determining the earliest second slot, the procedure to determine the earliest second slot is stopped, if after the multiplexing procedure, the PUCCH carrying SPS HARQ-ACK only is transmitted by the UE and may be received by the gNB as:

the PUCCH carrying SPS HARQ-ACK only is not overlapping with a cell/gNB DRX non-active period.

In the further implementations discussed below, for each of TDD and FDD cells, SPS HARQ-ACK is again deferred from a slot which is in (or overlaps with) a cell DRX non-active period. However, in the implementations below, it also defers SPS HARQ-ACK in cases where the SPS HARQ-ACK would be multiplexed on a dynamically scheduled PUCCH or a PUSCH. Based on the current specifications (as set out in section 9.2.5.4 of TS 38.213 Release 17 version 17.5.0) the SPS HARQ-ACK from a slot is not deferred if multiplexed on a PUSCH or dynamically scheduled PUCCH which would be cancelled or could not be transmitted (only if SPS HARQ-ACK only on PUCCH then you would defer).

A further example of a possible implementation of cell DRX-based SPS HARQ-ACK deferral for TDD/unpaired spectrum cells will now be briefly described with respect to the "UE procedure for deferring HARQ-ACK for SPS PDSCH" as set out in section 9.2.5.4 of TS 38.213 Release 17 version 17.5.0.

In this regard, a procedure similar to that set out in 9.2.5.4 is performed. However, the performance of the procedure is additionally dependent on the UE determining that "the cell for PUCCH transmission is in cell DRX non-active period". Also, with regards to the UE's determination of an earliest second slot, the UE determines an earliest second slot which is not a slot in cell DRX non-active period.

In order to provide a DRX-based SPS HARQ-ACK deferral for FDD/paired spectrum cells (which could also be applicable for TDD cells, such as for TDD cells if only SPS HARQ-ACK deferral due to overlapping with DRX is intended), a procedure similar to that discussed above for TDD cells could be carried out, except that the following conditions may be removed:

is provided by SPS-PUCCH-AN-List as described in clause 9.2.1, or by n1PUCCH-AN if SPS-PUCCH-AN-List is not provided is not cancelled by an overlapping PUCCH or PUSCH transmission of larger priority index overlaps with a symbol indicated as downlink by tdd-UL-DL-ConfigurationCommon or tdd-UL-DL-ConfigDedicated, or indicated for a SS/PBCH block by ssb-PositionsInBurst, or belonging to a CORESET associated with a Type0-PDCCH CSS set if the UE multiplexes the second HARQ-ACK information in a PUSCH, or in a PUCCH using a resource that is not from SPS-PUCCH-AN-List, or from n1PUCCH-AN if SPS-PUCCH-AN-List is not provided, the UE stops the procedure to determine the earliest second slot in the slot if the UE multiplexes the second HARQ-ACK information in a first PUCCH using a resource provided by SPS-PUCCH-AN-List, or by n1PUCCH-AN if SPS-PUCCH-AN-List is not provided, of smaller priority index and the UE drops the first PUCCH transmission due to an overlapping with a second PUSCH or PUCCH transmission of larger priority index, the UE stops the procedure to determine the earliest second slot in the slot if the UE multiplexes the second HARQ-ACK information in a first PUCCH using a resource provided by SPS-PUCCH-AN-List, or by n1PUCCH-AN if SPS-PUCCH-AN-List is not provided, and the PUCCH transmission is not dropped due to an overlapping with a PUSCH or PUCCH transmission of larger priority and does not have any symbol that overlaps with a symbol indicated as downlink by tdd-UL-DL-ConfigurationCommon or tdd-UL-DL-ConfigDedicated, or indicated for a SS/PBCH block by ssb-PositionsInBurst, or belonging to a CORESET associated with a Type0-PDCCH CSS set, the UE stops the procedure to determine the earliest second slot in the slot For any of the above implementations, the UE may be configured (e.g., via RRC) with a maximum deferral time related to cell DRX non active periods. In case of TDD, as soon as there is SPS HARQ-ACK deferral due to cell DRX, the UE may determine that the maximum deferral time is the sum of a maximum deferral time for DRX and a maximum deferral time for TDD. Alternatively, the UE may consider the maximum deferral time as the larger of: the maximum deferral time for DRX and the maximum deferral time for TDD. In another example, the UE may, for TDD, not be configured with a maximum deferral time related to cell DRX non active periods but the UE may consider the maximum deferral time for TDD for the combined SPS HARQ-ACK deferral procedure.

The disclosure and examples given above describe supporting SPS HARQ-ACK deferral for gNB energy saving (i.e., gNBs in DRX operation) in order to prevent SPS HARQ-ACK dropping when the gNB is in a DRX non-active period/mode/state, i.e. how the pre-existing SPS HARQ-ACK deferral procedure may be enhanced/revised so as to take into consideration cell DRX. In a broadly similar fashion, the PUCCH repetition procedure may be enhanced/revised so as to take into consideration cell DRX.

For the PUCCH repetition procedure, there is currently a deferral procedure for TDD operation to guarantee a number of PUCCH repetitions in case of collision with TDD symbols. With the introduction of cell DRX (non-active periods of gNB reception), without any, changes the number of PUCCH repetitions could not be guaranteed (as the gNB could be in a period of DRX inactivity for one or more PUCCH repetitions). Accordingly, it would be desirous to provide a PUCCH repetition process that takes into account cell DRX.

Figure 3:
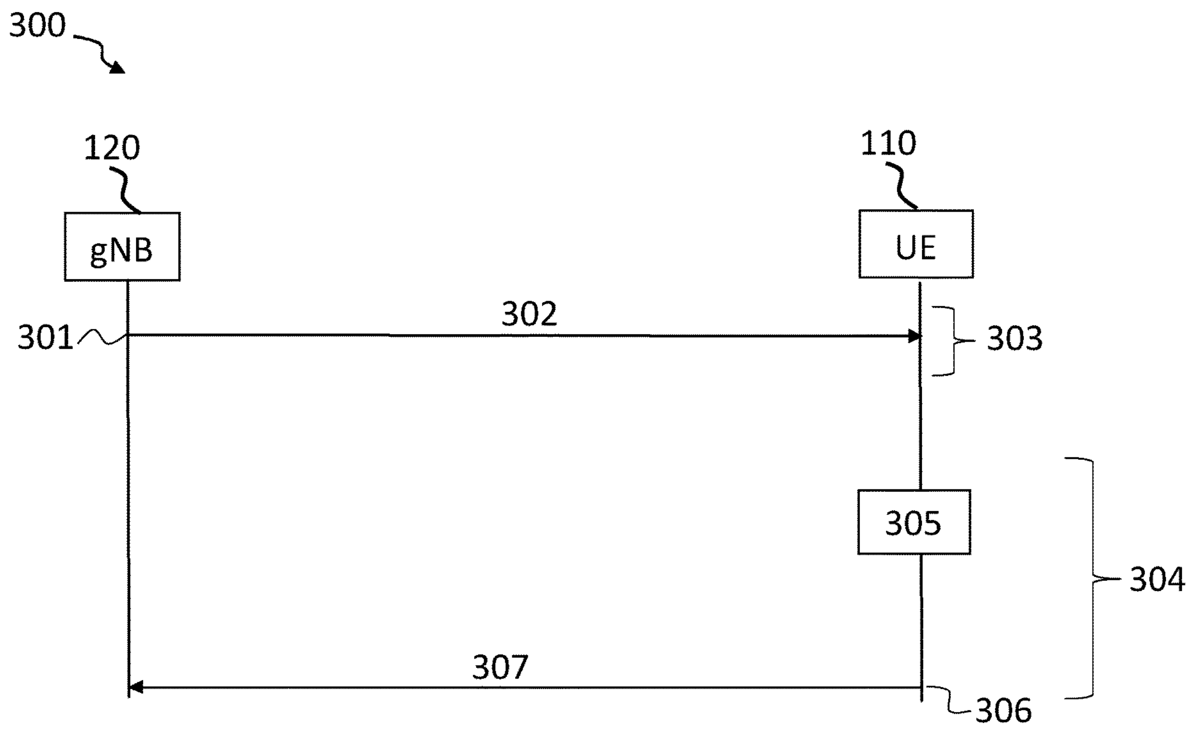
FIG. 3 schematically illustrates another method in accordance with an example of the subject matter described herein.

FIG. 3 schematically illustrates a method 300 in accordance with an example of the subject matter described herein. FIG. 3 illustrates one or more actions/functions performed by/at a plurality of entities (namely a first apparatus and a second apparatus, each of which apparatuses are themselves described with reference to FIG. 4, that shall simply be referred to hereinafter as UE 110 and gNB 120 respectively). FIG. 3 may therefore be considered to illustrate a method performed at/by the UE and a method performed at/by the gNB. The actions/functions depicted in FIG. 3 may also be implemented by a computer program (such as is described with reference to FIG. 5). The blocks illustrated in FIG. 3 may thereby represent actions in a method, functionality performed by an apparatus, and/or sections of instructions/code in a computer program.

In the illustrated method, a gNB transmits/signals, via transmission 301 to a UE 110, Discontinuous Reception, DRX, timing information 302 indicative of at least one time period of cell DRX inactivity. The receipt of such DRX timing information 302 thereby enables the UE to determine, as indicated by 303, DRX timing information. The UE may hence determine at least one time period during which the gNB is in a DRX non-active period/mode/state (and thus consequently would be unable to receive transmissions from the UE).

As indicated in 304, the UE controls a repetition of a PUCCH transmission based at least in part on the DRX timing information.

Such control of the repetition of a PUCCH transmission may comprise the UE determining (as shown in block 305) a plurality of PUCCH slots for the repetition of the PUCCH transmission such that a PUCCH transmission in at least one or more (preferably all) of the plurality of PUCCH slots is not contemporaneous/coincides/overlaps with the at least one time period of cell DRX inactivity of the RAN node.

For TDD cells, such determining of a plurality of PUCCH resources for PUCCH repetition may comprise the UE determining $$N_{PUCCH}^{repeat}$$

slots for PUCCH transmission (which need not necessarily be a consecutive number of slots), by considering PUCCH repetition deferral and the overlapping of the PUCCH with symbols of cell DRX non-active periods in addition to overlapping of the PUCCH with semi-static DL and SSB symbols.

For FDD cells, such determining of a plurality of PUCCH resources for PUCCH repetition may comprise the UE determining $$N_{PUCCH}^{repeat}$$

slots for PUCCH transmission, by considering PUCCH repetition deferral and the overlapping of the PUCCH with symbols of cell DRX non-active periods. For example, the UE may determine $$N_{PUCCH}^{repeat}$$

slots (e.g. 4 slots) where there is no overlap (and such slots do not need to be consecutive).

The control of the repetition of a PUCCH transmission may comprise, repeating transmissions (as indicated in 306 and 307) of the PUCCH transmission using the plurality of PUCCH resources in the $$N_{PUCCH}^{repeat}$$

slots.

The method may thereby support PUCCH repetition deferral for gNB energy saving (i.e., cell/gNB DRX operation) to prevent PUCCH dropping and to retain a number of PUCCH repetitions when the gNB is in a DRX non-active period/mode/state.

There now follows a brief discussion of an example of a possible implementation of the above-described DRX-based PUCCH repetition control and deferral. In this regard, the PUCCH repetition procedure (as set out in section 9.2.6 of TS 38.213 Release 17 version 17.5.0) may be expanded/enhanced so as to include additional conditions to be taken into account with regards to a PUCCH repetition deferral procedure.

For TDD/unpaired spectrum cells, the UE determines a number of slots for PUCCH transmission, namely $$N_{PUCCH}^{repeat},$$

by, in addition to the current considerations for PUCCH repetition deferral (namely regarding only considering semi-static UL and semi-static flexible symbols not overlapping with SSB (i.e. SS/PBCH)), also taking the overlapping of the PUCCH with symbols of cell DRX non-active periods into account.

For FDD/paired spectrum cells, the UE determines a number of slots for PUCCH transmission, namely $$N_{PUCCH}^{repeat},$$

by increasing the PUCCH repetition bundle size by a number of slots, in the case where the PUCCH resource would have symbols overlapping with a DRX non-active period. This is done in order to guarantee an intended PUCCH repetition number.

An example of a possible implementation of cell DRX-based PUCCH deferral will now be briefly described with respect to the "PUCCH repetition procedure" as set out in section 9.2.6 of TS 38.213 Release 17 version 17.5.0.

In this regard, a procedure similar to that set out in 9.2.6 is performed, except for the differences mentioned below for each of: unpaired spectrum and paired spectrum or supplementary uplink band.

For unpaired spectrum, the UE determines $$N_{PUCCH}^{repeat}$$

having:

- an UL symbol that is not a symbol of cell DRX non-active periods or flexible symbol that is not SS/PBCH block symbol or a symbol of cell DRX non-active periods provided by startingSymbolIndex as a first symbol, and
- consecutive UL symbols or flexible symbols that are not SS/PBCH block symbols or a symbol of a cell DRX non-active period, starting from the first symbol, equal to or larger than a number of symbols provided by nrofsymbols Whereas, for paired spectrum or supplementary uplink band:

- if the UE is not provided with cell-DRX-Configuration, the UE determines the $$N_{PUCCH}^{repeat}$$

slots for a PUCCH transmission as the $$N_{PUCCH}^{repeat}$$

consecutive slots starting from a slot indicated to the UE, or a slot determined for SR reporting or for CSI reporting;

- if the UE is provided with cell-DRX-Configuration, the UE determines the $$N_{PUCCH}^{repeat}$$

slots for a PUCCH transmission starting from a slot indicated to the UE for HARQ-ACK reporting, or a slot determined for SR reporting or for CSI reporting and having:

- an UL symbol that is not a symbol of cell DRX non-active periods indicated by cell-DRX-Configuration provided by startingSymbolIndex as a first symbol, and
  - consecutive UL symbols that are not symbols of a cell DRX non-active period, starting from the first symbol provided by startingSymbolIndex, equal to or larger than a number of symbols provided by nrofsymbols.

As shown above, examples of the disclosure provide cell DRX-based SPS HARQ-ACK deferral and cell DRX-based PUCCH repetition deferral, that may avoid losing/dropping SPS HARQ-ACK and PUCCH repetitions due to cell DRX operations.

It will be understood that each block and combination of blocks illustrated in FIGS. 2 and 3, as well as the further functions described above, may be implemented by various means, such as hardware, firmware, and/or software including one or more computer program instructions. For example, one or more of the functions described above may be performed by a duly configured apparatus (such as an apparatus, e.g. UE or gNB, comprising means for performing the above-described functions). One or more of the functions described above may be embodied by a duly configured computer program (such as a computer program comprising computer program instructions which embody the functions described above and which may be stored by a memory storage device and performed by a processor).

As will be appreciated, any such computer program instructions may be loaded onto a computer or other programmable apparatus (i.e. hardware) to produce a machine, such that the instructions when performed on the programmable apparatus create means for implementing the functions specified in the blocks. These computer program instructions may also be stored in a computer-readable medium that may direct a programmable apparatus to function in a particular manner, such that the instructions stored in the computer-readable memory produce an article of manufacture including instruction means which implement the function specified in the blocks. The computer program instructions may also be loaded onto a programmable apparatus to cause a series of operational actions to be performed on the programmable apparatus to produce a computer-implemented process such that the instructions which are performed on the programmable apparatus provide actions for implementing the functions specified in the blocks.

Various, but not necessarily all, examples of the present disclosure may take the form of a method, an apparatus or a computer program. Accordingly, various, but not necessarily all, examples may be implemented in hardware, software or a combination of hardware and software.

Various, but not necessarily all, examples of the present disclosure are described using flowchart illustrations and schematic block diagrams. It will be understood that each block (of the flowchart illustrations and block diagrams), and combinations of blocks, may be implemented by computer program instructions of a computer program. These program instructions may be provided to one or more processor(s), processing circuitry or controller(s) such that the instructions which execute on the same create means for causing implementing the functions specified in the block or blocks, i.e. such that the method may be computer implemented. The computer program instructions may be executed by the processor(s) to cause a series of operational block/steps/actions to be performed by the processor(s) to produce a computer implemented process such that the instructions which execute on the processor(s) provide block/steps for implementing the functions specified in the block or blocks.

Accordingly, the blocks support: combinations of means for performing the specified functions; combinations of actions for performing the specified functions; and computer program instructions/algorithm for performing the specified functions. It will also be understood that each block, and combinations of blocks, may be implemented by special purpose hardware-based systems which perform the specified functions or actions, or combinations of special purpose hardware and computer program instructions.

Various, but not necessarily all, examples of the present disclosure provide both a method and corresponding apparatus comprising various modules, means or circuitry that provide the functionality for performing/applying the actions of the method. The modules, means or circuitry may be implemented as hardware, or may be implemented as software or firmware to be performed by a computer processor. In the case of firmware or software, examples of the present disclosure may be provided as a computer program product including a computer readable storage structure embodying computer program instructions (i.e. the software or firmware) thereon for performing by the computer processor.

Figure 4:
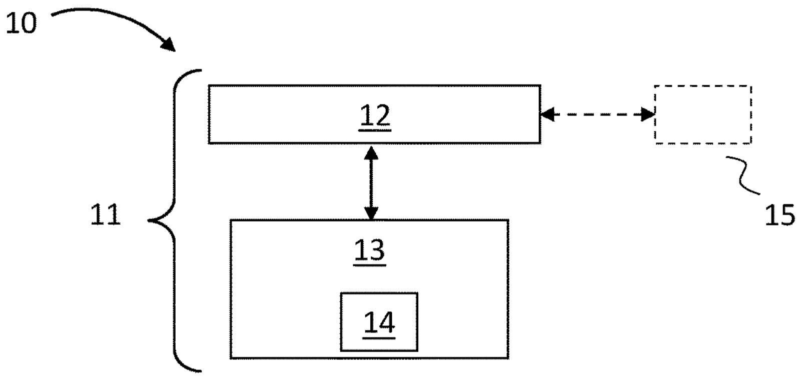
FIG. 4 schematically illustrates an apparatus in accordance with the subject matter described herein.

FIG. 4 schematically illustrates a block diagram of an apparatus 10 for performing the methods, processes, procedures and signalling described in the present disclosure and illustrated in FIGS. 2 and 3, in this regard the apparatus may perform the roles of the UE 110 or a gNB 120 in the illustrated and described methods. The component blocks of FIG. 4 are functional and the functions described may be performed by a single physical entity.

The apparatus comprises a controller 11, which could be provided within a device such as a UE 110 or a gNB 120.

The controller 11 may be embodied by a computing device, not least such as those mentioned above. In some, but not necessarily all examples, the apparatus may be embodied as a chip, chip set, circuitry or module, i.e. for use in any of the foregoing. As used here 'module' refers to a unit or apparatus that excludes certain parts/components that would be added by an end manufacturer or a user.

Implementation of the controller 11 may be as controller circuitry. The controller 11 may be implemented in hardware alone, have certain aspects in software including firmware alone or may be a combination of hardware and software (including firmware).

The controller 11 may be implemented using instructions that enable hardware functionality, for example, by using executable instructions of a computer program 14 in a general-purpose or special-purpose processor 12 that may be stored on a computer readable storage medium 13, for example memory, or disk etc, to be executed by such a processor 12.

The processor 12 is configured to read from and write to the memory 13. The processor 12 may also comprise an output interface via which data and/or commands are output by the processor 12 and an input interface via which data and/or commands are input to the processor 12. The apparatus may be coupled to or comprise one or more other components 15 (not least for example: a radio transceiver, sensors, input/output user interface elements and/or other modules/devices/components for inputting and outputting data/commands).

The memory 13 stores a computer program 14 comprising instructions (computer program instructions/code) that controls the operation of the apparatus 10 when loaded into the processor 12. The instructions of the computer program 14, provide the logic and routines that enables the apparatus to perform the methods, processes and procedures described in the present disclosure and illustrated in FIGS. 2 and 3. The processor 12, by reading the memory 13, is able to load and execute the computer program 14.

The computer program instructions may be comprised in a computer program, a non-transitory computer readable medium, a computer program product, a machine readable medium. The term "non-transitory," as used herein, is a limitation of the medium itself (i.e. tangible, not a signal) as opposed to a limitation on data storage persistency (e.g. RAM vs. ROM). In some but not necessarily all examples, the computer program instructions may be distributed over more than one computer program.

Although the memory 13 is illustrated as a single component/circuitry it may be implemented as one or more separate components/circuitry some or all of which may be integrated/removable and/or may provide permanent/semi-permanent/dynamic/cached storage.

Although the processor 12 is illustrated as a single component/circuitry it may be implemented as one or more separate components/circuitry some or all of which may be integrated/removable. The processor 12 may be a single core or multi-core processor.

The apparatus may include one or more components for effecting the methods, processes and procedures described in the present disclosure and illustrated in FIGS. 2 and 3. It is contemplated that the functions of these components may be combined in one or more components or performed by other components of equivalent functionality. The description of a function should additionally be considered to also disclose any means suitable for performing that function.

Where a structural feature has been described, it may be replaced by means for performing one or more of the functions of the structural feature whether that function or those functions are explicitly or implicitly described.

Although examples of the apparatus have been described above in terms of comprising various components, it should be understood that the components may be embodied as or otherwise controlled by a corresponding controller or circuitry such as one or more processing elements or processors of the apparatus. In this regard, each of the components described above may be one or more of any device, means or circuitry embodied in hardware, software or a combination of hardware and software that is configured to perform the corresponding functions of the respective components as described above.

The apparatus can, for example, be a client device, a server device, a mobile cellular telephone, a base station in a mobile cellular telecommunication system, a wireless communications device, a hand-portable electronic device, a location/position tag, a hyper tag etc. The apparatus may be embodied by a computing device, not least such as those mentioned above. However, in some examples, the apparatus may be embodied as a chip, chip set, circuitry or module, i.e. for use in any of the foregoing.

In one example, the apparatus is embodied on a hand held portable electronic device, such as a mobile telephone, mobile communication device, wearable computing device or personal digital assistant, that may additionally provide one or more audio/text/video communication functions (for example tele-communication, video-communication, and/or text transmission (Short Message Service (SMS)/Multimedia Message Service (MMS)/emailing) functions), interactive/non-interactive viewing functions (for example web-browsing, navigation, TV/program viewing functions), music recording/playing functions (for example Moving Picture Experts Group-1 Audio Layer 3 (MP3) or other format and/or (frequency modulation/amplitude modulation) radio broadcast recording/playing), downloading/sending of data functions, image capture function (for example using a (for example in-built) digital camera), and gaming functions, or any combination thereof.

With regards to cell DRX-based SPS HARQ-ACK deferral, in examples where the apparatus is provided within a UE 110, the apparatus comprises:

at least one processor 12; and at least one memory 13 storing instructions that, when executed by the at least one processor 12, cause the apparatus at least to:

determine Discontinuous Reception, DRX, timing information, wherein the DRX timing information is indicative of at least one time period of cell DRX inactivity;

determine Physical Uplink Control Channel, PUCCH, resource information, wherein the PUCCH resource information is indicative of a PUCCH resource for the apparatus to transmit a Semi-Persistent Scheduling Hybrid Automatic Repeat request Acknowledgment, SPS HARQ-ACK; and control a transmission of the SPS HARQ-ACK based at least in part on the DRX timing information and the PUCCH resource information.

With regards to cell DRX-based SPS HARQ-ACK deferral, in examples where the apparatus is provided within a gNB 120, the apparatus comprises:

at least one processor 12; and at least one memory 13 storing instruction that, when executed by the at least one processor 12, cause the apparatus at least to:

transmit, to a User Equipment, UE, Discontinuous Reception, DRX, timing information, wherein the DRX timing information is indicative of at least one time period of cell DRX inactivity;

transmit, to the UE, Physical Uplink Control Channel, PUCCH, resource information, wherein the PUCCH resource information is indicative of a PUCCH resource for the UE to transmit a Semi-Persistent Scheduling Hybrid Automatic Repeat request Acknowledgment, SPS HARQ-ACK; and control, based at least in part on the DRX timing information and the PCCH resource information, a reception of the SPS HARQ-ACK from the UE.

With regards to cell DRX-based PUCCH repetition deferral, in examples where the apparatus is provided within a UE 110, the apparatus comprises:

at least one processor 12; and at least one memory 13 storing instructions that, when executed by the at least one processor 12, cause the apparatus at least to:

determine Discontinuous Reception, DRX, timing information, wherein the DRX timing information is indicative of at least one time period of cell DRX inactivity; and control a repetition of a PUCCH transmission based at least in part on the DRX timing information.

With regards to cell DRX-based PUCCH repetition deferral, in examples where the apparatus is provided within a gNB 120, the apparatus comprises:

at least one processor 12; and at least one memory 13 storing instruction that, when executed by the at least one processor 12, cause the apparatus at least to:

transmit, to a User Equipment, UE, Discontinuous Reception, DRX, timing information, wherein the DRX timing information is indicative of at least one time period of cell DRX inactivity; and control, based at least in part on the DRX timing information, reception of repetition of a PUCCH transmission from the UE.

According to some examples of the present disclosure, there is provided a system (for example at least one UE 110 and a gNB 120).

The above described examples find application as enabling components of: tracking systems, automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things (IOT); Vehicle-to-everything (V2X), virtualized networks; and related software and services.

The apparatus may be provided in an electronic device, for example, a mobile terminal, according to an example of the present disclosure. It should be understood, however, that a mobile terminal is merely illustrative of an electronic device that would benefit from examples of implementations of the present disclosure and, therefore, should not be taken to limit the scope of the present disclosure to the same. While in certain implementation examples, the apparatus may be provided in a mobile terminal, other types of electronic devices, such as, but not limited to: mobile communication devices, hand portable electronic devices, wearable computing devices, portable digital assistants (PDAs), pagers, mobile computers, desktop computers, televisions, gaming devices, laptop computers, cameras, video recorders, GPS devices and other types of electronic systems, may readily employ examples of the present disclosure. Furthermore, devices may readily employ examples of the present disclosure regardless of their intent to provide mobility.

Figure 5:
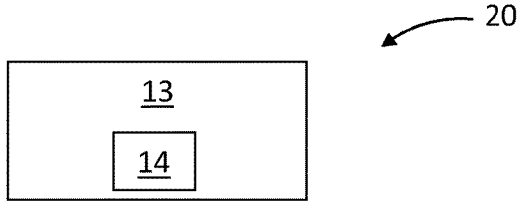
FIG. 5 schematically illustrates a computer program in accordance with the subject matter described herein.

FIG. 5, illustrates a computer program 14 which may be conveyed via a delivery mechanism 20. The delivery mechanism 20 may be any suitable delivery mechanism, for example, a machine-readable medium, a computer-readable medium, a non-transitory computer-readable storage medium, a computer program product, a memory device, a solid-state memory, a record medium such as a Compact Disc Read-Only Memory (CD-ROM) or a Digital Versatile Disc (DVD) or an article of manufacture that comprises or tangibly embodies the computer program 14. The delivery mechanism may be a signal configured to reliably transfer the computer program. An apparatus may receive, propagate or transmit the computer program as a computer data signal.

With regards to cell DRX-based SPS HARQ-ACK deferral, in certain examples of the present disclosure, there is provided a computer program comprising instructions, which when executed by an apparatus (e.g. UE 110), cause the apparatus to perform at least the following or for causing performing at least the following:

determining Discontinuous Reception, DRX, timing information, wherein the DRX timing information is indicative of at least one time period of cell DRX inactivity;

determining Physical Uplink Control Channel, PUCCH, resource information, wherein the PUCCH resource information is indicative of a PUCCH resource for the apparatus to transmit a Semi-Persistent Scheduling Hybrid Automatic Repeat request Acknowledgment, SPS HARQ-ACK; and controlling a transmission of the SPS HARQ-ACK based at least in part on the DRX timing information and the PUCCH resource information.

With regards to cell DRX-based SPS HARQ-ACK deferral, in certain examples of the present disclosure, there is provided computer program comprising instructions, which when executed by an apparatus (e.g. gNB 120), cause the apparatus to perform at least the following or for causing performing at least the following:

transmitting, to a User Equipment, UE, Discontinuous Reception, DRX, timing information, wherein the DRX timing information is indicative of at least one time period of cell DRX inactivity;

transmitting, to the UE, Physical Uplink Control Channel, PUCCH, resource information, wherein the PUCCH resource information is indicative of a PUCCH resource for the UE to transmit a Semi-Persistent Scheduling Hybrid Automatic Repeat request Acknowledgment, SPS HARQ-ACK; and controlling, based at least in part on the DRX timing information and the PCCH resource information, a reception of the SPS HARQ-ACK from the UE.

With regards to cell DRX-based PUCCH repetition deferral, in certain examples of the present disclosure, there is provided a computer program comprising instructions, which when executed by an apparatus (e.g. UE 110), cause the apparatus to perform at least the following or for causing performing at least the following:

determining Discontinuous Reception, DRX, timing information, wherein the DRX timing information is indicative of at least one time period of cell DRX inactivity; and controlling a repetition of a PUCCH transmission based at least in part on the DRX timing information.

With regards to cell DRX-based PUCCH repetition deferral, in certain examples of the present disclosure, there is provided computer program comprising instructions, which when executed by an apparatus (e.g. gNB 120), cause the apparatus to perform at least the following or for causing performing at least the following:

transmitting, to a User Equipment, UE, Discontinuous Reception, DRX, timing information, wherein the DRX timing information is indicative of at least one time period of cell DRX inactivity; and controlling, based at least in part on the DRX timing information, reception of repetition of a PUCCH transmission from the UE.

References to 'computer program', 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit (s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Although specific terms are employed herein, they are used in a generic and descriptive sense only and not for purposes of limitation.

Features described in the preceding description may be used in combinations other than the combinations explicitly described.

Although functions have been described with reference to certain features, those functions may be performable by other features whether described or not.

Although features have been described with reference to certain examples, those features may also be present in other examples whether described or not. Accordingly, features described in relation to one example/aspect of the disclosure may include any or all of the features described in relation to another example/aspect of the disclosure, and vice versa, to the extent that they are not mutually inconsistent.

Although various examples of the present disclosure have been described in the preceding paragraphs, it should be appreciated that modifications to the examples given may be made without departing from the scope of the invention as set out in the claims.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components may exist (including no intervening components), i.e. so as to provide direct or indirect connection/coupling/ communication. Any such intervening components may include hardware and/or software components.

As used herein, the term "determine/determining" (and grammatical variants thereof) may include, not least: calculating, computing, processing, deriving, measuring, investigating, identifying, looking up (for example, looking up in a table, a database or another data structure), ascertaining and the like. Also, "determining" may include receiving (for example, receiving information), retrieving/accessing (for example, retrieving/accessing data in a memory), obtaining and the like. Also, "determine/determining" may include resolving, selecting, choosing, establishing, and the like.

References to a parameter (for example DRX, timing information), or value of a parameter, should be understood to refer to "data indicative of", "data defining" or "data representative of" the relevant parameter/parameter value if not explicitly stated (unless the context demands otherwise). The data may be in any way indicative of the relevant parameter/parameter value, and may be directly or indirectly indicative thereof.

In this description, reference has been made to various examples. The description of features or functions in relation to an example indicates that those features or functions are present in that example. The use of the term 'example' or 'for example', 'can' or 'may' in the text denotes, whether explicitly stated or not, that such features or functions are present in at least the described example, whether described as an example or not, and that they may be, but are not necessarily, present in some or all other examples. Thus 'example', 'for example', 'can' or 'may' refers to a particular instance in a class of examples. A property of the instance may be a property of only that instance or a property of the class or a property of a sub-class of the class that includes some but not all of the instances in the class.

In this description, references to "a/an/the" [feature, element, component, means . . . ] are used with an inclusive not an exclusive meaning and are to be interpreted as "at least one" [feature, element, component, means . . . ] unless explicitly stated otherwise. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasise an inclusive meaning but the absence of these terms should not be taken to infer any exclusive meaning. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

The presence of a feature (or combination of features) in a claim is a reference to that feature (or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

In the above description, the apparatus described may alternatively or in addition comprise an apparatus which in some other examples comprises a distributed system of apparatus, for example, a client/server apparatus system. In examples where an apparatus provided forms (or a method is implemented as) a distributed system, each apparatus forming a component and/or part of the system provides (or implements) one or more features which collectively implement an example of the present disclosure. In some examples, an apparatus is re-configured by an entity other than its initial manufacturer to implement an example of the present disclosure by being provided with additional software, for example by a user downloading such software, which when executed causes the apparatus to implement an example of the present disclosure (such implementation being either entirely by the apparatus or as part of a system of apparatus as mentioned hereinabove).

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavouring in the foregoing specification to draw attention to those features of examples of the present disclosure believed to be of particular importance it should be understood that the applicant claims protection in respect of any patentable feature or combination of features hereinbefore referred to and/or shown in the drawings whether or not particular emphasis has been placed thereon.

The examples of the present disclosure and the accompanying claims may be suitably combined in any manner apparent to one of ordinary skill in the art. Separate references to an "example", "in some examples" and/or the like in the description do not necessarily refer to the same example and are also not mutually exclusive unless so stated and/or except as will be readily apparent to those skilled in the art from the description. For instance, a feature, structure, process, block, step, action, or the like described in one example may also be included in other examples, but is not necessarily included.

Each and every claim is incorporated as further disclosure into the specification and the claims are embodiment(s) of the present disclosure. Further, while the claims herein are provided as comprising specific dependencies, it is contemplated that any claims may depend from any other claims and that to the extent that any alternative embodiments may result from combining, integrating, and/or omitting features of the various claims and/or changing dependencies of claims, any such alternative embodiments and their equivalents are also within the scope of the disclosure.

We claim:

1. An apparatus comprising:

at least one processor; and at least one memory storing instruction that, when executed by the at least one processor, cause the apparatus at least to:

determine Discontinuous Reception (DRX) timing information, wherein the DRX timing information is indicative of at least one time period of cell DRX inactivity;

determine Physical Uplink Control Channel (PUCCH) resource information, wherein the PUCCH resource information is indicative of a PUCCH resource for the apparatus to transmit a Semi-Persistent Scheduling Hybrid Automatic Repeat request Acknowledgment (SPS HARQ-ACK); and based on a determination that the PUCCH resource at least partially overlaps with the at least one time period of cell DRX inactivity, control a transmission of the SPS HARQ-ACK such that the SPS HARQ-ACK is not transmitted on the PUCCH resource during the at least one time period of cell DRX inactivity.

2. The apparatus of claim 1, wherein the PUCCH resource is in a first PUCCH slot, and wherein controlling the transmission of the SPS HARQ-ACK comprises at least one selected from a group of:

preventing, based at least in part on the DRX timing information and the PUCCH resource information, transmission of the SPS HARQ-ACK using the PUCCH resource;

preventing, based at least in part on the DRX timing information and the PUCCH resource information, transmission of the SPS HARQ-ACK during the at least one time period of cell DRX inactivity;

determining to defer the transmission of the SPS HARQ-ACK to a second PUCCH slot based at least in part on determining whether the PUCCH resource at least partially overlaps in time with the at least one time period of cell DRX;

deferring the transmission of the SPS HARQ-ACK to a second PUCCH slot responsive to determining that the PUCCH resource at least partially overlaps in time with the at least one time period of cell DRX inactivity;

performing, responsive to determining that the PUCCH resource at least partially overlaps in time with the at least one time period of cell DRX inactivity, a procedure to defer the transmission of the SPS HARQ-ACK to a second PUCCH slot; and transmitting a deferred transmission of the SPS HARQ-ACK in a second PUCCH resource in a second PUCCH slot.

3. The apparatus of claim 1, wherein the apparatus is further caused to:

determine, based at least in part on the DRX timing information, a second PUCCH resource in a second PUCCH slot for the apparatus to transmit the SPS HARQ-ACK.

4. The apparatus of claim 3, wherein determining the second PUCCH resource comprises at least one selected from a group of:

determining the second PUCCH slot such that the second PUCCH resource in the second PUCCH slot does not coincide in time with the at least one time period of cell DRX inactivity; and determining the second PUCCH slot such that a time difference between a first PUCCH slot that the PUCCH resource is in and the second PUCCH slot does not exceed a threshold deferral time, and optionally wherein the threshold deferral time is based at least in part on a received maximum deferral time related to cell DRX inactive periods.

5. The apparatus of claim 3, wherein the apparatus is further caused to transmit the SPS HARQ-ACK using the second PUCCH resource in the second PUCCH slot.

6. The apparatus of claim 1, wherein the transmission of the SPS HARQ-ACK is deferred and the deferred transmission of the SPS HARQ-ACK is multiplexed with at least one selected from a group of:

a HARQ-ACK;

at least one further SPS HARQ-ACK; and an Uplink Control Information, UCI.

7. The apparatus of claim 1, wherein the apparatus is further caused to:

receive configuration information for configuring the apparatus to perform an SPS HARQ-ACK DRX deferral procedure for deferring transmission of the SPS HARQ-ACK based at least in part on the DRX timing information.

8. The apparatus of claim 1, wherein the PUCCH resource information is received by at least one from a group of:

dedicated PUCCH resource configuration received from a RAN node;

PUCCH-ResourceSet, and

SPS-PUCCH-AN-List in PUCCH-Config, or by n1PUCCH-AN in SPS-Config.

9. An apparatus comprising:

at least one processor; and at least one memory storing instruction that, when executed by the at least one processor, cause the apparatus at least to:

transmit, to a User Equipment (UE), Discontinuous Reception (DRX) timing information, wherein the DRX timing information is indicative of at least one time period of cell DRX inactivity;

transmit, to the UE, Physical Uplink Control Channel (PUCCH) resource information, wherein the PUCCH resource information is indicative of a PUCCH resource for the UE to transmit a Semi-Persistent Scheduling Hybrid Automatic Repeat request Acknowledgment (SPS HARQ-ACK); and based on a determination that the PUCCH resource at least partially overlaps with the at least one time period of cell DRX inactivity a reception of the SPS HARQ-ACK from the UE such that the apparatus expects to receive the SPS HARQ-ACK on a deferred PUCCH resource that does not overlap with the at least one time period of cell DRX inactivity.

10. The apparatus of claim 9, wherein controlling the reception of the SPS HARQ-ACK comprises:

determining, based at least in part on the DRX timing information, a second PUCCH resource for receiving the SPS HARQ-ACK from the UE.

11. An apparatus comprising:

at least one processor; and at least one memory storing instruction that, when executed by the at least one processor, cause the apparatus at least to:

determine Discontinuous Reception (DRX) timing information, wherein the DRX timing information is indicative of at least one time period of cell DRX inactivity; and based on a determination that a Physical Uplink Control Channel (PUCCH) slot for a repetition of a PUCCH transmission at least partially overlaps with the at least one time period of cell DRX inactivity, control the repetition of the PUCCH transmission such that the PUCCH transmission is not repeated during the at least one time period of cell DRX inactivity.

12. The apparatus of claim 11, wherein controlling repetition of the PUCCH transmission comprises:

determining a plurality of PUCCH slots for the repetition of the PUCCH transmission such that the PUCCH transmission in the plurality of PUCCH slots is not contemporaneous with the at least one time period of cell DRX inactivity, and repeating transmission of the PUCCH transmission using the plurality of PUCCH slots.

13. The apparatus of claim 12, wherein determining the plurality of PUCCH slots further comprises determining the plurality of PUCCH slots such that the PUCCH transmission in the plurality of PUCCH slots is not contemporaneous with semi-static DL or SSB symbols.

* * * * *